United States Patent [19]

Weier

[11] E Re. 30,742

[45] Reissued Sep. 15, 1981

[54] CONTAINER DEPALLETIZING APPARATUS

[75] Inventor: Roman J. Weier, North St. Paul, Minn.

[73] Assignee: Wyard Industries, Inc., Forest Lake, Minn.

[21] Appl. No.: 897,298

[22] Filed: Apr. 17, 1978

Related U.S. Patent Documents

Reissue of:

[64] Patent No.: 3,543,949
Issued: Dec. 1, 1970
Appl. No.: 782,884
Filed: Dec. 11, 1968

[51] Int. Cl.[2] ..... B65G 59/02

[52] U.S. Cl. ..... 414/119; 198/485; 198/486; 198/738; 221/10

[58] Field of Search ..... 214/8.5 A, 8.5 F, 8.5 C; 221/9, 10; 198/429, 430, 485, 486, 690, 738; 414/118, 119, 120

[56] References Cited

U.S. PATENT DOCUMENTS

| | | | |
|---|---|---|---|
| 807,106 | 12/1905 | Behringer | 198/430 |
| 1,906,605 | 5/1933 | Hutchinson | 198/430 |
| 1,912,503 | 6/1933 | Sturm | 198/429 |
| 1,998,163 | 4/1935 | Meyer | 198/430 X |
| 2,080,858 | 5/1937 | Dorman | 198/430 |
| 2,094,497 | 9/1937 | Ross | 198/430 X |
| 2,964,162 | 12/1960 | Sherts | 198/340 |
| 2,994,444 | 8/1961 | Peterson | 198/597 X |
| 3,040,867 | 6/1962 | Posten | 198/430 |
| 3,107,794 | 10/1963 | Bechtold | 214/8.5 A |
| 3,187,909 | 6/1965 | Jeremiah | 214/8.5 A |
| 3,338,374 | 8/1967 | Dudley | 198/690 |

FOREIGN PATENT DOCUMENTS

| | | | |
|---|---|---|---|
| 1077109 | 3/1960 | Fed. Rep. of Germany | 214/8.5 F |

OTHER PUBLICATIONS

Guide To Magnetic Conveying and Handling, Bunting Magnetics Co., 9245 Cherry St., Franklin Park, Ill. 60131, Catalog #466-1, 12-30-66.

*Primary Examiner*—Stephen G. Kunin
*Assistant Examiner*—George F. Abraham
*Attorney, Agent, or Firm*—John C. Barnes

[57] ABSTRACT

Lift mechanism adapted to receive a pallet containing a plurality of tiers of containers thereon and move said pallet vertically approximately the height of a tier of containers to be depalletized whereby a sweep arm engages the tier of containers between parallel, spaced apart guide rails and a removable restraining arm engages the tier of containers on the opposite side to substantially encircle the tier and urge it on to a conveyor belt. As the tier of containers is urged on to the conveyor belt the restraining arm is removed just prior to the mingling of the tier of containers with containers already present on the conveyor belt.

10 Claims, 10 Drawing Figures

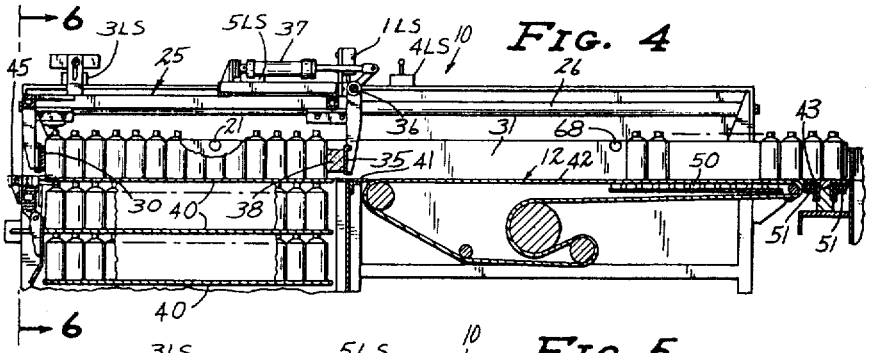
FIG. 4
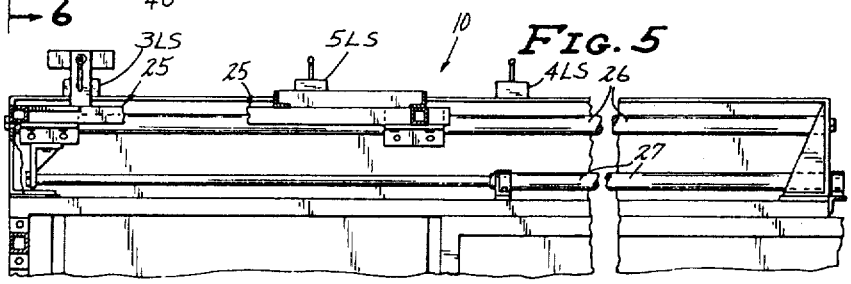
FIG. 5
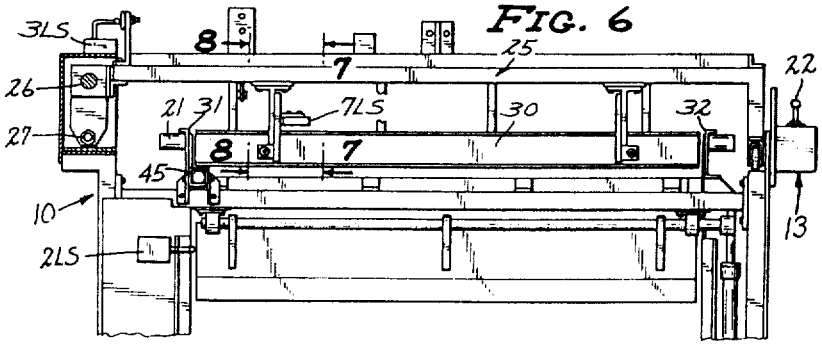
FIG. 6
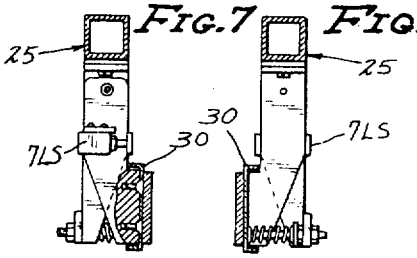
FIG. 7
FIG. 8

CONTAINER DEPALLETIZING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

Many products for public consumption are packaged in containers, such as aerosol cans, plastic bottles, and the like, by the producer of the product. In general, the containers are purchased from various container manufacturers and shipped to the producer. For convenience in handling the containers are stacked in tiers on pallets with a chipboard square positioned between tiers to prevent damage. It is then necessary for the producer to depalletize or remove the containers from the pallets and position them for filling and packaging prior to the sale thereof.

2. Description of the Prior Art

In the prior art a lift mechanism is utilized to raise pallets approximately a tier at a time and a sweep mechanism moves each successive tier from the pallet on to a conveyor belt. There is no means associated with the prior art devices of maintaining the containers upright and, therefore, these devices are useful only in depalletizing containers which are relatively stable on their bases. Any attempt to depalletize topheavy containers in these prior art devices results in tipping of the containers and consequent inoperativeness of the depalletizing device.

SUMMARY OF THE INVENTION

The present invention pertains to container depalletizing apparatus including lift mechanism for receiving a pallet therein having a plurality of tiers of containers stacked thereon and moving said pallet in vertical incremental steps, sweep means for urging each tier of containers positioned therein onto conveying means, and restraining means for encircling said tier of containers in combination with said sweep means to prevent tipping thereof.

It is an object of the present invention to provide new and improved container depalletizing apparatus.

It is a further object of the present invention to provide container depalletizing apparatus capable of depalletizing topheavy containers, such as aerosol cans, plastic bottles and the like.

It is a further object of the present invention to provide container depalletizing apparatus including restraining means in conjunction with the sweep means for preventing tipping of containers while they are being urged onto a conveying system.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the FIGS.:

FIG. 4 is a sectional view as seen from the line 4—4 in FIG. 2;

FIG. 5 is an enlarged sectional view as seen from the line 5—5 in FIG. 2, portions thereof broken away;

FIG. 6 is an enlarged sectional view as seen from line 6—6 in FIG. 4;

FIG. 7 is an enlarged fragmentary sectional view as seen from the line 7—7 in FIG. 6, portions thereof broken away and shown in section;

FIG. 8 is an enlarged fragmentary sectional view as seen from the line 8—8 of FIG. 6;

DESCRIPTION OF THE PREFERRED EMBODIMENT

Figure 1:
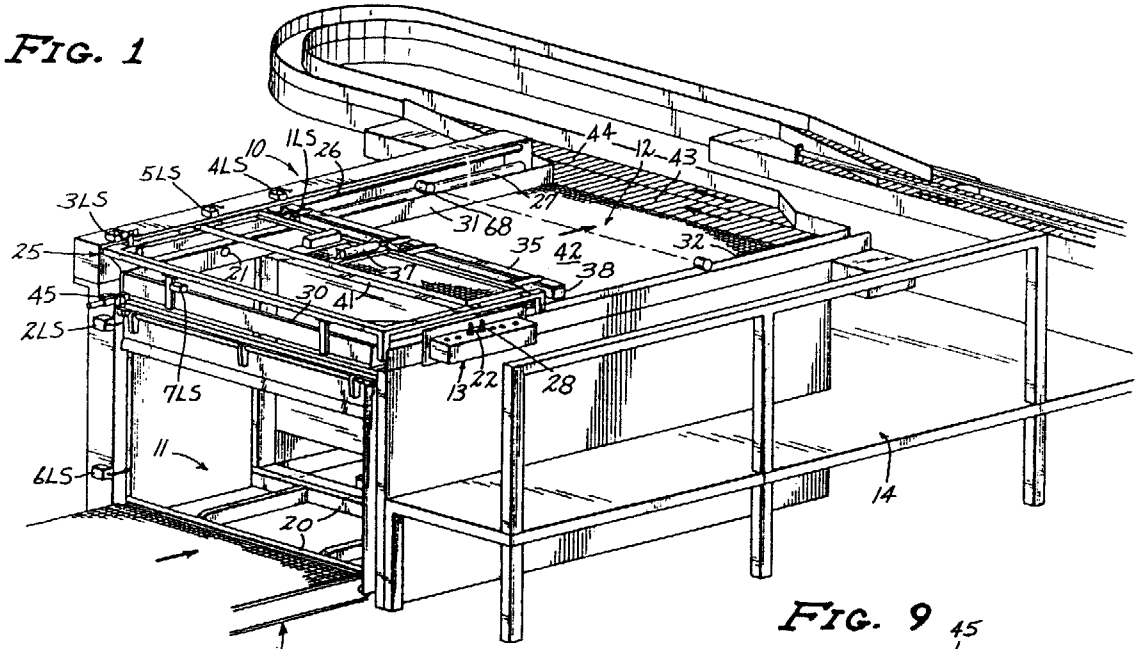
FIG. 1 is a view in perspective of the container depalletizing apparatus.
Figure 9:
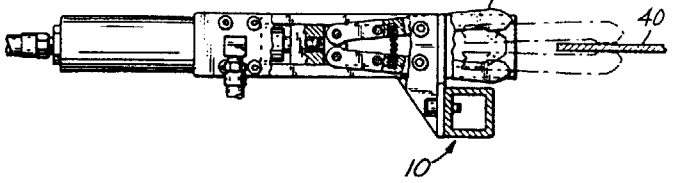
FIG. 9 is an enlarged fragmentary sectional view as seen from the line 9—9 of FIG. 2, portions thereof broken away and shown in section.

In the FIGS. the numeral 10 generally designates a tablelike housing having a lift mechanism 11 adjacent the front end thereof, conveying mechanism 12 adjacent the rear end thereof, a control panel 13 attached to one side of the housing 10 and a walkway 14 extending along the side of the housing 10 having the control panel 13 attached thereto and the rear end for the convenience of an operator. A conveying system 15 is utilized to bring pallets having cans stacked thereon into the lift mechanism 11. It should be understood that the various parts of the depalletizing apparatus might be altered or eliminated depending upon the desired result and the interconnections of the various parts might be altered considerably depending upon the performance desired.

The lift mechanism 11 includes a pair of cooperating lift arms 20 mounted within the housing 10 for relative vertical movement and powered hydraulically by mechanism not shown. The arms 20 are movable in substantially any desired vertical increments (generally the increments will be equal to the height of a tier of cans positioned on a pallet) between a lower position in which the upper surface of the arms 20 are substantially parallel with the upper surface of the conveying system 15 and an upper position in which the upper surface of the arms 20 are substantially parallel with the upper surface of the conveying mechanism 12. A photoelectric cell 21, or other light sensitive device, is positioned within the housing 10 above the arms 20 so as to be actuated when a tier of cans positioned on a pallet on the arms 20 is in the correct vertical position to be moved onto the conveying mechanism 12. The lift mechanism 11 is raised and lowered by means of a lever 22 on the control panel 13, illustrated schematically in FIG. 10.

A generally rectangularly shaped frame 25 is positioned generally above the arms 20 for sliding horizontal movements on a rod 26 at one side thereof, the other side thereof being provided with roller elements which have rolling engagement with housing 10. The frame 25 is movable from the position above the arms 20 to a position generally above the conveying mechanism 12 by means of a large hydraulic cylinder 27. The energization and, consequently, the direction of movement of the frame 25 is controlled by a lever 28 on the control panel 13. The lever 28 is illustrated schematically in FIG. 10. The frame 25 is mounted for horizontal movement a sufficient distance above the conveying mechanism 12 and the platform 20 so that it will not contact any containers properly positioned therebelow.

An elongated sweep member 30 is attached to the frame 25 so as to extend downwardly from the edge thereof adjacent the forward end of the housing 10. Guide rails 21 and 31 extend in a generally parallel spaced apart relationship from the forward to the rear edge of the housing 10 and the sweep member 30 extends approximately therebetween. The sweep member 30 and the guide rails 31 and 32 are positioned so that activation of the frame 25 moves the sweep member 30 horizontally between the guide rails 31 and 32 in a generally longitudinal direction relative thereto.

Figures 2, 3:
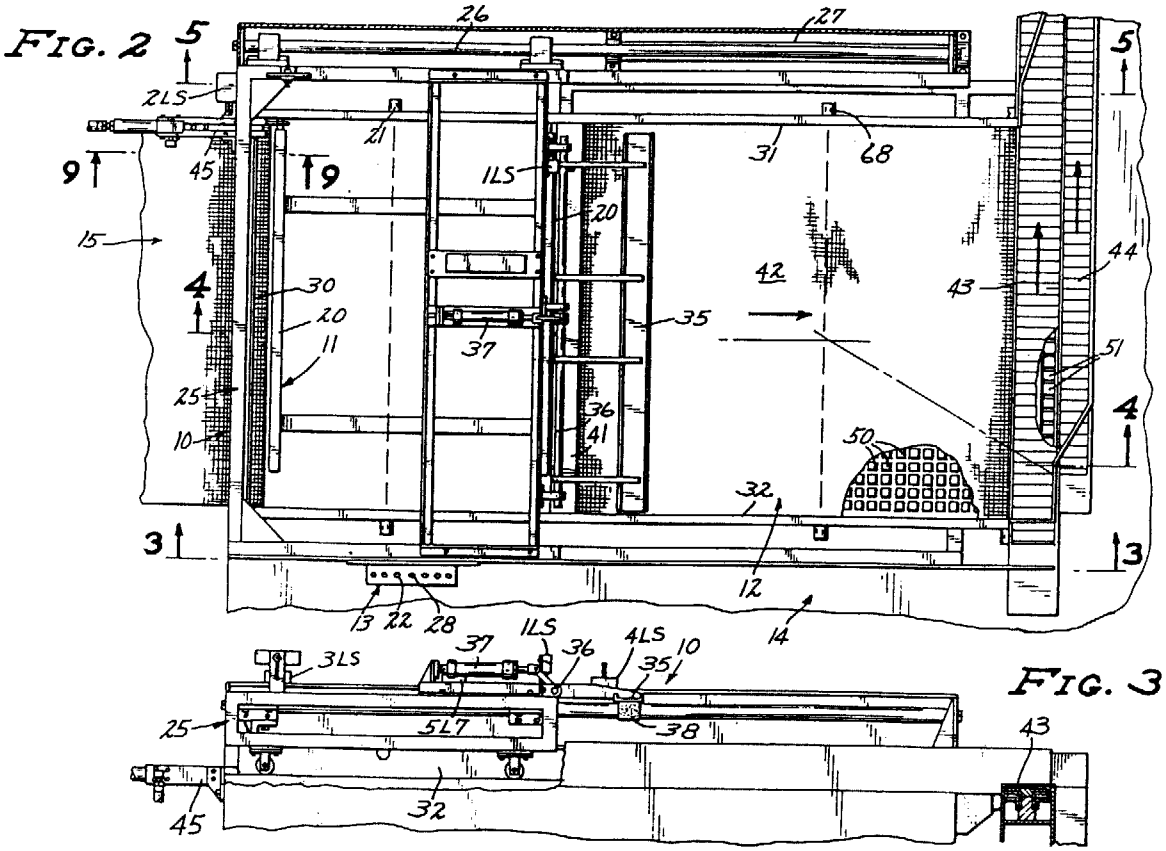
FIG. 2 is a view in top plan of the apparatus illustrated in FIG. 1, portions thereof broken away and shown in section.
FIG. 3 is a sectional view as seen from the line 3—3 in FIG. 2, portions thereof broken away.

Restraining means, which in this embodiment is an elongated arm 35, are attached to the frame 25 opposite the member 30. The arm 35 is pivotally attached to the frame 25 by means of a generally horizontal axle 36 so that the arm 35 extends approximately perpendicular to and between the guide rails 31 and 32. The arm 35 is attached to the axle 36 for rotation therewith and a hydraulic cylinder 37 is connected between the frame 25 and the axle 36 so that actuation thereof rotates the axle 36 (and consequently the arm 35). The hydraulic cylinder 37 moves the arm 35 between a container clamping position (see FIG. 4) in which a tier of containers positioned on a pallet supported by arms 20 are completely encircled by the arm 35, rails 31 and 32, and the sweep member 30 and a second position, see FIGS. 1—3, in which the arm 35 is rotated upwardly out of contact with the containers. The surface of the arm 35 adjacent the lift mechanism 11 has a relatively thick layer of padding material 38 thereon to insure that containers in a tier engaged thereby are pushed tightly together. It should be understood that many configurations of the arm 35 could be utilized and the padding material 38 may not be necessary in certain configurations. Further, the particular direction of movement of the arm 35 disclosed in the present embodiment is convenient for the apparatus disclosed but other directions and types of movement may be utilized to remove the restraining means from the forward side of a tier of containers.

Referring to FIG. 4 a plurality of tiers of containers are illustrated within the lift mechanism 11 and chipboards 40 are illustrated between the tiers of containers. When a tier of containers is properly positioned within the lift mechanism 11, the chipboard 40 immediately therebelow is approximately parallel with a fixed apron 41 which guides the containers from the chipboard 40 onto the conveying mechanism 12. In this embodiment, the conveying mechanism 12 is an endless belt 42 operating between the guide rails 31 and 32 to move the entire tier of containers toward a second elongated endless belt 43. The containers are then shunted from the endless belt 43 onto an endless belt 44 in a continuous single row. In the present embodiment the three endless belts 42, 43 and 44 are utilized to change the direction of movement of the containers and to insure a continuous line of containers on the endless belt 44 which carries the containers to the final desired location. A chipboard clamp 45 is actuated to grasp the chipboard prior to actuation of the hydraulic cylinder 27 so that the sweep member 30 moves the containers smoothly on the chipboard 40. Once the containers are removed from a chipboard 40 the clamp 45 is deenergized and the operator manually removes the chipboard 40 to uncover the next tier of containers. It should be understood that any type of mechanism might be utilized to hold the chipboard 40 immovable while the containers are being swept therefrom and the present clamp 45 is illustrated only for exemplary purposes.

To aid the containers in remaining upright once they are moved onto the endless belts 42, and 43, a plurality of magnets 50 and 51, respectively, are permanently positioned beneath the belts 42 and 43. The belts 42 and 43 are both constructed of nonmagnetic material and, when the containers positioned thereabove are formed from magnetic material the magnets 50 and 51 attract the bottom of the containers and maintain the containers upright.

The present apparatus is constructed so as to be semi-automatic, that is an operator is required to operate the lift mechanism 11 and the frame 25 and sweep member 30, but several safety features are incorporated which automatically prevent damage of the apparatus and insure the correct operation thereof, as will become apparent presently. It should be understood that the following description of the electrical apparatus and connections could be modified in several ways, such as to make the apparatus fully automatic.

A first limit switch designated 1LS is mounted on the frame 25 so as to be actuaated by the arm 35 in the can-engaging position. A second limit switch designated 2LS is attached to the housing 10 adjacent the lift mechanism 11 so as to be actuated by one of the arms 20 at a predetermined raised position. In general this predetermined raised position will be when the last tier of containers is in the depalletizing position (parallel with and movable onto the conveying mechanism 12). A third limit switch designated 3LS is attached to the upper surface of the housing 10 adjacent the forward end thereof so as to be actuated by the frame 25 when it is in normal (retracted) position or directly above the lift mechanism 11. A fourth limit switch designated 4LS is positioned on the upper surface of the housing 10 and is spaced from the third limit switch 3LS a distance slightly less than the distance the frame 25 moves along the housing 10. The fourth limit switch 4LS is actuated by the same portion of the frame 25 that actuates the third limit switch 3LS when the frame 25 approaches the limit of its stroke. A fifth limit switch designated 5LS is positioned between the third and fourth limit switches 3LS and 4LS and is actuated by the same portion of the frame 25 as actuates the limit switches 3LS and 4LS. A sixth limit switch designated 6LS is attached to the front end of the housing 10 so as to be actuated by one of the arms 20 shortly prior to reaching the down or lower position. A seventh limit switch designated 7LS is positioned at the front of the frame 25 above the sweep member 30 (see FIG. 7) so as to be actuated by excessive pressure on the sweep member 30 due to jamming or wedging of the containers.

FIG. 8 is a schematic diagram illustrating the connection of various electrical components to a power line. Two lines designated L1 and L2 are adapted to be connected to a suitable source of power and the following components are connected therebetween in the described manner. A first normally closed pushbutton switch SW1 and a second normally closed pushbutton switch SW2 are connected in series with one side of the series connection attached to the line L1. The pushbutton switch SW1 is a stop switch located on the control panel 13 while the pushbutton switch SW2 is a stop switch located at some convenient remote position. A first normally open pushbutton switch SW3 and a second normally open pushbutton SW4 are connected in parallel and the parallel connection is connected in series with the first and second pushbutton switches SW1 and SW2. The pushbutton switch SW3 is located at some convenient remote position while the pushbutton switch SW4 is located on the control panel 13. A main control relay designated CR is connected in series with the pushbutton switches SW1, SW2 and the parallel connection SW3 and SW4. Three normally closed overload switches OL1, OL2 and OL3 are connected in series between the main control relay CR and the line L2 to complete the series circuit. A first set of normally open contacts CR1 are connected in parallel with the pushbutton switches SW3 and SW4. Thus, depressing either of the pushbutton switches SW3 or SW4 completes an electrical circuit through the main control relay CR whereby the first set of contacts CR1 close and maintain power on the main control relay CR. To remove power from the main control relay CR either of the pushbutton switches SW1 or SW2 may be depressed or any of the overload switches OL1, OL2 or OL3 may open.

A second set of contacts CR2 of the main control relay CR are connected between the line L1 and a junction 60. The actuating switch for the lift mechanism 11, which is operated by the lever 22, includes two normally open sets of contacts 61 and 62. The actuating switch is constructed so that the lever 22 is normally in the central position and upon pushing it upwardly in FIG. 10 the set of contacts 61 are closed. Upon releasing the lever 22 it returns to the central position and the set of contacts 61 open. Pushing the lever 22 downwardly in FIG. 10 causes the set of contacts 62 to be closed. The set of contacts 61 of the actuating switch are connected in series with a normally open set of contacts 7R1 (of a relay 7R to be explained presently), a normally closed set of contacts 21a associated with the photoelectric cell 21 and a solenoid valve SV1 between the junction 60 and the line L2. The solenoid valve SV1 allows fluid under pressure to be supplied to the lift mechanism 11 to raise the arms 20. The second set of contacts 62 of the actuating switch are connected in series with the limit switch 6LS and a solenoid valve SV2 between the junction 60 and the line L2. The solenoid valve SV2 supplies fluid to the lift mechanism 11 to lower the arms 20 at a high rate of speed. A solenoid valve SV3 is connected in parallel with the series connection of the limit switch 6LS and the solenoid valve SV2. The solenoid valve SV3 supplies fluid under pressure to the lift mechanism 11 to lower the arms 20 at a low rate of speed. The limit switch 4LS has a normally closed set of contacts 4LS1 and a normally open set of contacts 4LS2. The normally closed set of contacts 4LS1 are connected in series with a normally open set of contacts TD1, of a time delay relay TD, and the time delay relay TD between the junction 60 and the line L2. A set of normally open contacts 21b associated with the photoelectric cell 21 are connected between the series connection of the time delay relay TD and the first set of contacts TD1 and the series connection of sets of contacts 7R1 and 21a. The normally open set of contacts 4LS2 are connected in series with a normally open set of contacts 5R1 and a coil 5RU between the junction 60 and the line L2.

A third set of normally open contacts CR3 of the main control relay CR are connected between the line L1 and a junction 65. A second set of normally open contacts TD2 are connected in series with the limit switch 2LS and a solenoid valve SV4 between the junction 65 and the line L2. The solenoid valve SV4 operates the chipboard clamp 45 when activated. The limit switch 3LS is connected in series with the relay 7R between the junction 65 and the line L2.

Figure 10:
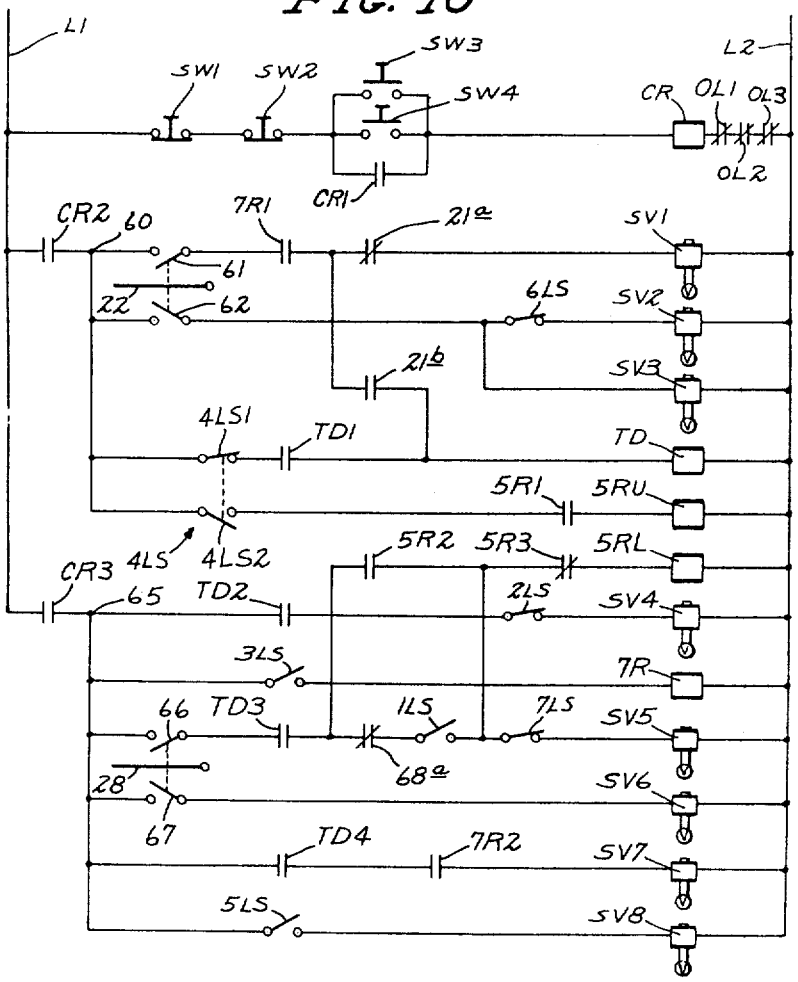
FIG. 10 is a schematic drawing of the electrical circuitory in the apparatus.

An actuating switch for the frame 25 and attached sweep member 30, which actuating switch is operated by the lever 28, has two sets of normally open contacts 66 and 67. The lever 28 is normally in the central position, as seen in FIG. 10, and upon moving the lever 28 downwardly the set of contacts 67 are closed. When the lever 28 is moved upwardly in FIG. 10 the set of contacts 66 are closed. The lever 28 is not spring board so that it will remain in the position in which the operator places it until it is moved by the operator. The set of contacts 66 are connected in series with a third set of normally open contacts TD3 of the time delay TD, a set of normally closed contacts 68a associated with a photoelectric cell 68, the normally open limit switch 1LS, the normally closed limit switch 7LS and a solenoid valve SV5 between the junction 65 and the line L2. The photoelectric cell 68 is positioned adjacent the top of the guide rail 31 approximately midway along the conveying mechanism 12 with the activating light source located at the opposite side of the conveying mechanism 12. The solenoid valve SV5 provides fluid under pressure to the hydraulic cylinder 27 to move the frame 25 and the sweep member 30 toward the conveying mechanism 12. The contacts 67 are connected in series with a solenoid valve SV6 between the junction 65 and the line L2. The solenoid valve SV6 supplies fluid under pressure to the hydraulic cylinder 27 to move the frame 25 and sweep member 30 toward the forward end of the housing 10 into the normal position above the lift mechanism 11.

A normally open set of contacts 5R2 are connected in parallel with the normally closed set of contacts 68a and the normally open limit switch 1LS. A set of normally closed contacts 5R3 are connected in series with a coil 5RL and the series connection is connected in parallel with tee limit switch 7LS and the solenoid valve SV5. A fourth set of normally open contacts TD4 of the time delay relay TD are connected in series with a normally open set of contacts 7R2 of the relay 7R and a solenoid valve SV7 between the junction 65 and the line L2. The solenoid valve SV7 supplies fluid parallel pressure to the hydraulic cylinder 37 to move the arm 35 into engagement with a tier of containers. The normally open limit switch 5LS is connected in series with a solenoid valve SV8 between the junction 65 and the line L2. The solenoid valve SV8 supplies fluid under pressure to the hydraulic cylinder 37 to raise the arm 35 out of engagement with the tiers of containers.

In the operation of the present apparatus the conveying system 15 is operated until a pallet loaded with a plurality of tiers of containers is positioned within the lift mechanism 11 on the arms 20. Assuming the frame 25 and sweep member 30 are in the normal position and the limit switch 3LS is closed, the lever 22 is moved upwardly (in FIG. 10), by the operator, whereby electrical power is supplied to the solenoid valve SV1. The lift mechanism 11 raises the arms 20 until a tier of containers thereon interrupts the light impinges upon the photocell 21, whereupon, the normally closed contacts 21a open and the solenoid valve SV1 is automatically deenergized. The placement of the photocell 21 insures that the uppermost tier of containers is correctly positioned to be urged onto the conveying mechanism 12. It should be noted that once the tier of containers interrupts the light impinging upon the photoelectric cell 21 the normally open pair of contacts 21b close and, assuming the lever 22 is still in its uppermost position, power is supplied to the time delay relay TD. After the predetermined amount of time has passed and the pair of contacts TD4 closes the solenoid valve SV7 operates actuating the hydraulic cylinder 37 and moving the arm 35 into engagement with the uppermost tier of containers. When the arm 35 moves into engagement with the containers the limit switch 1LS closes and upon movement of the lever 28 to the up position (in FIG. 10), by the operator, energy is supplied to the solenoid valve SV5 which allows pressurized fluid to enter the hydraulic cylinder 27 and move the frame 25 and sweep arm 30 toward the conveying mechanism 12.

As the frame 25 leaves the normal position the limit switch 3LS is disengaged and the relay 7R is deenergized, thereby, deenergizing the solenoid valve SV7. Upon moving a short distance from the completed stroke the frame 25 closes the limit switch 5LS whereby the solenoid valve SV8 is energized and pressurized fluid enters the hydraulic cylinder 37 raising the arm 35 from engagement with the containers. The arm 35 is raised from engagement with the containers prior to the comingling of the tier of containers with containers already present on the conveying mechanism 12 so that there are no gaps between succeeding tiers of containers. Thus, the arm 35, the sweep member 30 and the guide rails 31 and 32 encircle the tier of containers until they are about to mingle with containers already present on the conveying mechanism 12 whereupon the arm 35 is retracted. Once the frame 25 has moved about the conveying mechanism 12 sufficiently far to close the limit switch 4LS the lever 28 may be moved downwardly (in FIG. 8) by the operator whereby a circuit is completed energizing the solenoid valve SV6 which allows pressurized fluid to enter the hydraulic cylinder 27 and move the frame 25 back toward the normal position.

The coils 5RU and 5RL are unlatching and latching coils for a latching relay which provide a bypass circuit to continue applying power to the solenoid valve SV5 after the arm 35 is raised and the limit switch 1LS is opened. The photoelectric cell 68 has the pair of normally closed contacts 68a associated therewith to prevent the operator from depalletizing a second layer of containers until the preceeding layer of containers has cleared the photoelectric cell 68. Once the layer of containers being depalletized breaks the source of light to the photoelectric cell 68 the pair of contacts 68a opens. However, the previous energization of the coil 5RL closes the normally open set of contacts 5R1 completing a circuit around the normally closed contacts 68a and the normally open contacts 1LS. Thus, the apparatus continues to move the tiers of containers onto the conveying mechanism 12 and into comingling engagement with containers previously positioned thereon until the frame 25 operates the limit switch 4LS. Operation of the limit switch 4LS closes the normally open contacts 4LS2, whereby the coil 5RU is energized unlatching the relay and returning the set of contacts 5R1, 5R2 and 5R3 to the normal position.

Depalletizing apparatus has been disclosed which maintains containers upright during the depalletizing operation even through the containers may be topheavy cans, such as aerosol cans. Further, the apparatus contains electrical circuitory which effectively prevents improper operation thereof. Also, because of the novel electrical circuitry a single operator can perform the entire operation.

I claim:

1. Container depalletizing apparatus comprising:

a. lift mechanism for receiving a pallet therein having a plurality of tiers of containers stacked thereon and moving the pallet vertically approximately the height of a tier of containers to be depalletized;

b. conveying means operatively mounted adjacent the lift mechanism for receiving tiers of containers from pallets positioned in said lift mechanism and conveying them to a desired location;

c. sweep means mounted adjacent said lift mechanism for engaging at least a rear side of the tier of containers to be depalletized and urging said tier of containers onto said conveying means;

d. container restraining means having a tier engaging position for engaging the leading containers of the uppermost tier *and pushing said containers in the tier tightly together toward said sweep means* and a disengaged position; and e. means connecting said restraining means to said sweep means for movement of said restraining means with said [seep] *sweep* means to prevent tipping of individual containers in said tier.

2. Container depalletizing apparatus as set forth in claim 1 wherein the conveying means includes an endless belt type conveyor.

3. Container depalletizing apparatus as set forth in claim 2 including magnetic means positioned below and in juxtaposition to the endless belt type conveyor for maintaining containers formed of magnetic material positioned thereon in an upright position.

4. Container depalletizing apparatus as set forth in claim 1 wherein the sweep means includes an elongated member and means mounting said elongated member for horizontal movement between a pair of spaced apart guide members so the tier of containers to be depalletized is contained on three sides.

5. Container depalletizing apparatus as set forth in claim 4 wherein the restraining means includes an arm that engages the tier of containers to be depalletized along the side not engaged by the elongated member and guide member so that the sweep means and the restraining means substantially encircle the tier of containers.

6. Container depalletizing apparatus as set forth in claim 5 including a relatively thick layer of resilient material on the portion of the arm adjacent the tier of containers.

7. Container depalletizing apparatus as set forth in claim 1 including means for removing the restraining means from engagement with the tier of containers before the tier of containers is completely removed from the pallet.

8. Container depalletizing apparatus as set forth in claim 5 including means mounting the arm on means mounting the elongated member for horizontal movement therewith.

9. Container depalletizing apparatus as set forth in claim 1 having in addition means associated with the lift mechanism and the sweep means to prevent operation of the lift mechanism until the sweep means is in a normal position.

10. Container depalletizing apparatus as set forth in claim 1 having in addition means associated with the sweep means and the restraining means to prevent operation of the sweep means until the restraining means is in the tier engaging position.

* * * * *